United States Patent [19]

Crossonneau

[11] Patent Number: 4,549,771
[45] Date of Patent: Oct. 29, 1985

[54] COMPOSITE STRUCTURE AND IN PARTICULAR A SLIDE FOR A WINDOW RAISER OF AN AUTOMOBILE VEHICLE

[75] Inventor: Denis Crossonneau, Sully-sur-Loire, France

[73] Assignee: Compagnie Industrielle de Mecanismes, France

[21] Appl. No.: 696,954

[22] Filed: Mar. 22, 1985

Related U.S. Application Data

[63] Continuation of Ser. No. 475,287, Mar. 14, 1983, abandoned.

[30] Foreign Application Priority Data

Mar. 22, 1982 [FR] France ............................. 82 04819

[51] Int. Cl.[4] ............................................. F16C 29/02
[52] U.S. Cl. .................................... 308/3 R; 16/93 R;
16/DIG. 27; 403/353; 403/381

[58] Field of Search ............... 308/3 R, 3.6; 52/594;
16/93 R, 95 R, 93 D, DIG. 27, DIG. 33;
49/348–352, 360, 361; 403/339, 340, 353, 354,
361, 381, 382, 331

[56] References Cited

U.S. PATENT DOCUMENTS

| 3,100,556 | 8/1963 | De Ridder | 52/594 X |
| 3,111,205 | 11/1963 | Greshan | 52/594 X |
| 3,182,769 | 5/1965 | De Ridder | 52/594 |

FOREIGN PATENT DOCUMENTS 2019484 10/1979 United Kingdom ................. 49/352

Primary Examiner—Stuart S. Levy
Assistant Examiner—David Werner

[57] ABSTRACT

Each shoe 3, 4 of the slide 1 is a moulded element which is fitted in a notch 8 in a base plate 2 of the slide by a movement of rotation which is prevented in the opposite direction when the slide is mounted on a guide rail 5 therefor. In this way, there is achieved an assembly which is strong, precise and cheap.

8 Claims, 6 Drawing Figures

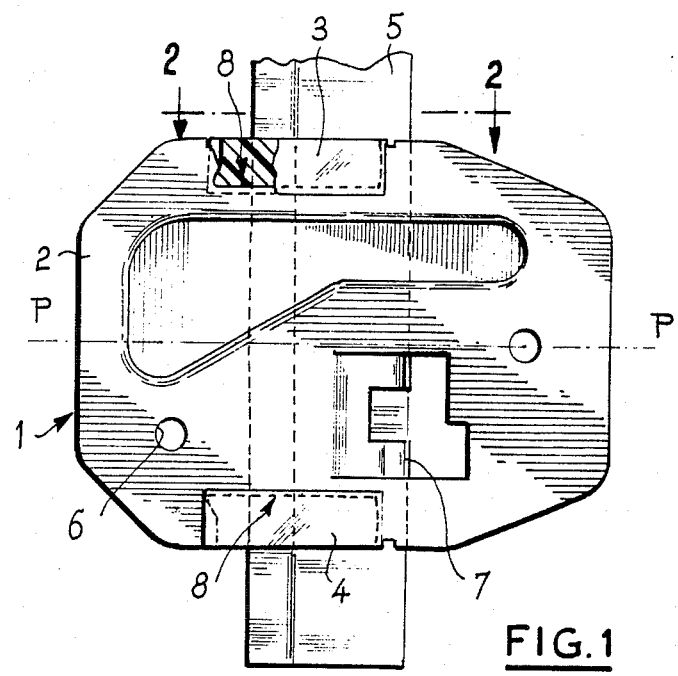
FIG.1
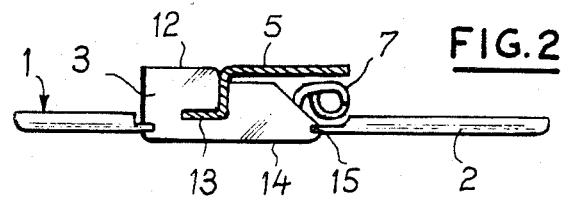
FIG.2
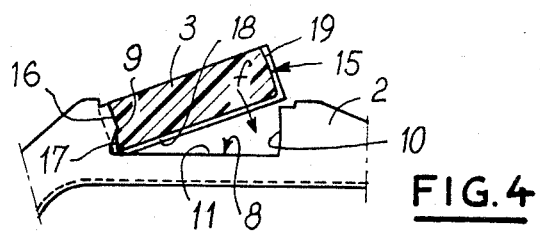
FIG.3
FIG.4
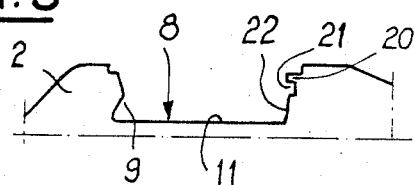
FIG.5
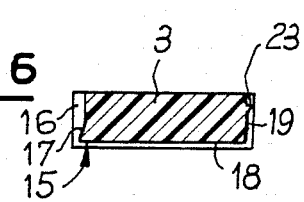
FIG.6

COMPOSITE STRUCTURE AND IN PARTICULAR A SLIDE FOR A WINDOW RAISER OF AN AUTOMOBILE VEHICLE

This application is a continuation of application Ser. No. 475,287, filed Mar. 14, 1983, now abandoned.

The present invention relates to slides, in particular for an automobile window raiser, and more particularly relates to various types of composite structures comprising at least two elements and adapted to cooperate with a positioning or guiding element.

The window raiser slides of automobiles usually comprise a metal base plate provided with at least one shoe of moulded plastics material adapted to slide along a guide rail. Owing to the considerable forces to which the slide is subjected and the required guiding precision, it cannot be envisaged to fix the shoe by simple conventional means such as a clipping assembly. This is why the shoe is usually moulded directly onto the base plate, which results in satisfactory mechanical performances.

However, this method is relatively expensive, since it employs a moulding machine with numerous lost periods corresponding to the placing in position of the base plate in the mould and the discharging of the finished slide. Now, the operating time of the machine is expensive.

An object of the invention is to provide means for assembling these slides or like composite structures which are cheaper for a given mechanical performance.

The invention therefore provides generally a composite structure comprising at least two elements and adapted to cooperate with a positioning or guiding element, wherein the two elements have respective shapes adapted to cooperate in such manner as to assemble said two elements by a relative movement of the two elements which is thereafter prevented in the opposite direction by the positioning or guiding element.

In a particular application, the invention also provides a slide, in particular for an automobile window raiser, of the type comprising a base plate provided with at least one moulded shoe adapted to slide along a rail, wherein the shoe is placed in position in a notch in the base plate by a movement thereof which includes a component which is non-parallel to the rail.

In one embodiment of this slide, the or each notch has a generally rectangular shape and includes on one edge a point and on the opposite edge a recess, the or each shoe being provided on three sides with a fitting groove one side of which has a nose portion adapted to be inserted behind the point by a movement of rotation of the shoe about the apex of the point.

The invention will be described hereinafter in detail with reference to the accompanying drawing which shows only one embodiment of the invention. In the drawing:

FIG. 1 is a plan view, with a part cut away, of a window raiser slide according to the invention;

FIG. 2 is a sectional view taken on line 2—2 of FIG. 1;

FIG. 3 is a sectional view of a shoe of this slide;

FIG. 4 illustrates the mounting of a shoe;

FIGS. 5 and 6 are respectively a partial view of the slide and a sectional view of a shoe of a modification.

The slide 1 shown in FIGS. 1 and 2 comprises a sheet metal base plate 2 having a generally planar and rectangular shape and two shoes 3, 4 which are moulded from plastics material and mounted on the plate 2. The slide 1 is adapted to slide along a substantially rectilinear rail 5 which, when it is mounted on a vehicle, is normally disposed vertically, as shown.

The base plate 2 has apertures 6 for the fixing of a window glass base (not shown) and means 7 for fixing to a flexible actuating element (not shown) connected to a winding device (not shown). Each of the two horizontal sides of this plate has a generally rectangular notch 8 in which a shoe 3 or 4 is disposed. The notches 8 and the two shoes are the mirror image of each other relative to a horizontal plane P passing through the centre of the slide 2.

As can be seen better in FIG. 4, each notch 8 has a very wide V-shaped pointed portion 9 which projects inwardly from one of the small vertical sides of the notch. The apex angle of the V is in the presently-described embodiment of the order of 130°. The other vertical small side 10 of the notch has the shape of an arc of a circle having its centre on the apex of the pointed portion 9, which is located half-way down the small side of the notch. The bottom 11 of the latter is rectilinear and horizontal.

Each shoe 3, 4 consists of a block of moulded plastics material which has a generally parallelepipedic shape and includes in its rear surface 12 an L-shaped slot 13 which extends vertically through the shoe. Close to its front surface 14, the shoe has a fitting groove 15 bordering on said front surface on three sides of the shoe.

With reference to the upper shoe 3, the groove 15 extends on its two vertical small sides and on its lower large side. As can be seen in FIGS. 1 and 3, this groove has a contour corresponding to that of the upper notch 8 except that the upper side of the V-shaped pointed portion 9 is replaced by a semi-side 16 constituting a wider V, that is, in the presently-described embodiment, by a vertical semi-side. The groove 15 therefore includes in succession this semi-side 16, a semi-side 17 which is inclined downwardly and outwardly and defines a nose portion, a rectilinear large side 18, and a small side 19 in the shape of an arc of a circle whose centre is located on the intersection of the semi-sides 16 and 17.

The mounting of the shoe 3 is illustrated in FIG. 4. This shoe is brought to the notch obliquely by applying the semi-side 16 against the upper side of the V-shaped portion 9, then the shoe is turned about the apex of this V in the direction of arrow f. The curvilinear side 19 of the shoe then slides along the corresponding side 10 of the notch until the large side 18 of the shoe abuts against the large side or bottom 11 of the notch.

When the two shoes 3 and 4 are in this way symmetrically placed in position in the two notches 8, the slots 13 are exactly in alignment; the two shoes can thus be slipped in succession on the rail 5, which has a corresponding L-shaped section. The cooperation of the shoes with the rail prevents the shoes from effecting relative to the plate 2 a movement of rotation in a direction opposite to that which had permitted the mounting of the shoe and the vertical disengagement of the shoes is rendered impossible by the undercut of the V-shaped portion 9 and the arc of a circle 10.

The assembly achieved in this way is precise and reliable and is capable of resisting great forces. Moreover, the moulding machine is employed only for the moulding of the two shoes and the remainder of the production period concerns the mounting of the two moulded shoes on the plate 2 in the manner described hereinbefore, which mounting is a much cheaper operation. The cost of the slide can therefore be considerably reduced.

By way of a modification, the arc of a circle 10 may be replaced by other contours, provided that these contours permit the movement of rotation of the shoes described hereinbefore and retain the shoes in cooperation with the V-shaped portion 9, when this shoe is urged in translation toward the entrance of its notch 8. FIG. 5 shows an example of such a contour which is constituted, starting at the entrance of the notch, by a nose portion 20, a recess 21 and a segment of an arc of a circle 22 corresponding to the arc of a circle 10 and connected to the bottom 11 of the notch.

Such a notch 8 then receives a show 3 such as that shown in FIG. 6. In this case, the small side 19 in the shape of an arc of a circle of the groove 15 of the show 3 includes a projecting lug 23 which clips behind the nose portion 20 in the recess 21 so as to achieve a temporary retention of the shoe in the notch 8 before and during the introduction of the rail 5 in the slot 13, so as to facilitate this mounting. Thereafter, the clipping system 20-23 no longer performs its shoeretaining function since the rail 5 itself performs this function, as explained hereinbefore.

Having now described my invention what I claim as new and desire to secure by Letters Patent is:

1. A slide assembly for a window raiser of an automobile comprising:
   (a) a base plate having opposite edge surfaces having a thickness dimension, each edge surface defining a generally rectangular notch therein, one side of each notch having a "V" shape with its apex extending inwardly of the notch;
   (b) a sliding shoe mounted in each notch, each shoe having a generally rectangular cross-section and defining a groove extending about at least a portion of its periphery, the groove having a width greater than the thickness dimension of the edge surfaces so as to be slidably received therein;
   (c) retaining means defined by the sliding shoe and contacting the "V" shaped side of the notch to prevent translation movement of the shoe with respect to the base plate, but permit rotational movement of the sliding shoe about the apex of the "V" shaped side of the notch; and,
   (d) a substantially rectilinear rail slidably inserted through a portion of the sliding shoes to prevent their rotation relative to the base plate.

2. The slide assembly of claim 1 wherein the retaining means comprises an inclined side portion formed within the groove such that it contacts a portion of the "V" shaped side of the notch to prevent translation movement of the shoe with respect to the base plate.

3. The slide assembly of claim 2 wherein the side of each notch opposite the "V" shaped side is arcuate in shape, the center of the arc being located at the apex of the "V" shaped side.

4. The slide assembly of claim 3 wherein each of the shoes has a correspondingly curved arcuate portion formed within the groove.

5. The slide assembly of claim 4 wherein the shoes are formed of a molded plastic material.

6. The slide assembly of claim 2 wherein the side of each notch opposite the "V" shaped side comprises a first portion having an arcuate shape with its center located at the apex of the "V" shaped side and a second portion defining a recess.

7. The slide assembly of claim 6 wherein each of the shoes has a correspondingly curved arcuate portion and a projecting lug formed within the groove and located such that the projecting lug engages the recess to retain the shoes on the base plate.

8. The slide assembly of claim 2 wherein the shoes are formed of a molded plastic material.

* * * * *